(12) United States Patent
Tsirline et al.

(10) Patent No.: US 7,839,287 B2
(45) Date of Patent: Nov. 23, 2010

(54) NEAR-FIELD MINIATURE COUPLER

(75) Inventors: Boris Y. Tsirline, Glenview, IL (US); Karl Torchalski, Arlington Heights, IL (US); Martin Andreas Karl Schwan, Chicago, IL (US)

(73) Assignee: ZIH Corp., Hamilton (BM)

( * ) Notice: Subject to any disclaimer, the term of this patent is extended or adjusted under 35 U.S.C. 154(b) by 623 days.

(21) Appl. No.: 11/694,329

(22) Filed: Mar. 30, 2007

(65) Prior Publication Data

US 2008/0238606 A1 Oct. 2, 2008

(51) Int. Cl.
*G08B 13/14* (2006.01)

(52) U.S. Cl. .................. 340/572.7; 340/10.51; 455/41.1

(58) Field of Classification Search ............. 340/572.1, 340/572.7, 10.51; 455/41.1; 343/700 MS; 235/439, 449; 333/32–34
See application file for complete search history.

(56) References Cited

U.S. PATENT DOCUMENTS

| | | | |
|---|---|---|---|
| 2,812,501 A | 11/1957 | Sommers | |
| 3,665,480 A | 5/1972 | Fassett | |
| 5,192,954 A | 3/1993 | Brockelsby et al. | |
| 5,317,646 A | 5/1994 | Sang, Jr. et al. | |
| 5,652,711 A | 7/1997 | Vennekens | |
| 5,983,243 A | 11/1999 | Heiney et al. | |
| 6,012,083 A | 1/2000 | Savitzky et al. | |
| 6,177,872 B1 * | 1/2001 | Kodukula et al. | 340/572.7 |
| 6,246,326 B1 * | 6/2001 | Wiklof et al. | 340/572.1 |
| 6,421,018 B1 | 7/2002 | Zeilinger et al. | |
| 6,624,718 B2 | 9/2003 | Mauritz et al. | |
| 6,802,659 B2 | 10/2004 | Cremon et al. | |
| 6,848,616 B2 | 2/2005 | Tsirline et al. | |
| 6,899,476 B1 * | 5/2005 | Barrus et al. | 340/572.1 |

(Continued)

FOREIGN PATENT DOCUMENTS

EP    1 394 719 A1    3/2004

(Continued)

OTHER PUBLICATIONS

Constantine A. Balanis; Chapter 2—Fundamental Parameters of Antennas: Paragraph 2.2.4 - Field Regions; Antenna Theory: Analysis and Design; 2005; pp. 34-36; Third Edition; John Wiley & Sons, Inc.

(Continued)

*Primary Examiner*—Thomas J Mullen
(74) *Attorney, Agent, or Firm*—Alston & Bird LLP

(57) ABSTRACT

A near-field coupler for a RFID system is provided. The coupler is configured to selectively communicate with a targeted transponder from among a group of multiple adjacent transponders. The coupler includes a conductive strip terminated by a load. The load is for matching an input impedance of the coupler to a source impedance of a transceiver. The conductive strip is based on a quarter wavelength of the center operating frequency. The conductive strip may have a substantially constant width and a length substantially equal to the quarter wavelength. Or the conductive strip may have a variable width defining a tapered profile and a length less than the quarter wavelength. The tapered profile may be an exponential profile or a Klopfenstein profile. Due to the overall size of the coupler to a typical transponder, the center of the coupler and the center of the transponder may be offset during coupling.

18 Claims, 3 Drawing Sheets

U.S. PATENT DOCUMENTS

| | | | |
|---|---|---|---|
| 7,037,009 | B2 | 5/2006 | Barrus et al. |
| 7,142,815 | B2 | 11/2006 | Desjeux et al. |
| 7,342,499 | B2 * | 3/2008 | Chiu et al. ............... 340/572.7 |
| 7,375,633 | B2 * | 5/2008 | Shanton ................... 340/572.1 |
| 7,398,054 | B2 * | 7/2008 | Tsirline et al. ............. 455/41.1 |
| 7,425,887 | B2 * | 9/2008 | Tsirline et al. ........... 340/572.1 |
| 7,586,410 | B2 | 9/2009 | Tsirline et al. |
| 2001/0029857 | A1 * | 10/2001 | Heredia et al. .............. 101/288 |
| 2003/0063001 | A1 | 4/2003 | Hohberger et al. |
| 2005/0045723 | A1 | 3/2005 | Tsirline et al. |
| 2005/0045724 | A1 | 3/2005 | Tsirline et al. |
| 2005/0206524 | A1 | 9/2005 | Forster et al. |
| 2006/0132312 | A1 | 6/2006 | Tavormina |
| 2007/0063843 | A1 | 3/2007 | Tsirline et al. |
| 2007/0099566 | A1 * | 5/2007 | Borisov et al. ............. 455/41.1 |
| 2007/0216591 | A1 | 9/2007 | Tsirline et al. |

FOREIGN PATENT DOCUMENTS

| | | |
|---|---|---|
| FR | 2 822 594 | 9/2002 |
| WO | WO 01/35320 A1 | 5/2001 |

OTHER PUBLICATIONS

David M. Pozar; Paragraph 2.5—The Quarter-Wave Transformer; Microwave Engineering; 2005; pp. 73-76; Third Edition; John Wiley & Sons, Inc.

Xianming Qing and Ning Yang; 2.45 ghz circularly polarized rfid reader antenna; IEEE; 2004; pp. 612-615 (XP10743394).

Ron Schmitt; Understanding electromagnetic fields and antenna radiation takes (almost) no math; EDN; Mar. 2, 2000; pp. 77-88; available at <http://www.edninag.com>.

* cited by examiner

NEAR-FIELD MINIATURE COUPLER

BACKGROUND OF THE INVENTION

1. Field of the Invention

The present invention relates to RFID couplers and, in particularly, to spatially selective couplers capable of selectively communicating with a targeted transponder from among a group of adjacent transponders.

2. Description of Related Art

Radio frequency identification (RFID) transponders, either active or passive, are typically used with an RFID transceiver or similar device for communicating information back and forth. In order to communicate, the transceiver exposes the transponder to a radio frequency (RF) electromagnetic field or signal. In the case of a passive UHF transponder, the RF electromagnetic field energizes the transponder and thereby prompts the transponder to respond to the transceiver by re-radiating the received signal and modulating it in a well-known technique called backscattering. In the case of an active transponder, the transponder may respond to the electromagnetic field by transmitting an independently powered reply signal to the transceiver.

Problems can occur when interrogating multiple adjacent transponders regardless on whether the transponders are passively or actively powered. For example, an interrogating electromagnetic signal may activate more than one transponder at a given time. This simultaneous activation of multiple transponders may lead to collision errors because each of the multiple transponders may transmit reply signals to the transceiver at the same time.

Several collision management techniques commercially exist for allowing near simultaneous communication between multiple transponders and a single transceiver while reducing communication errors. However, such collision management techniques tend to increase system complexity, cost, and delay response. Furthermore, such techniques are often "blind" in that they cannot locate a given transponder or more specifically recognize the position of a transponder within the interrogating RF electromagnetic field. For example, in a printer-encoder device, the device would not know whether the transceiver was communicating with the transponder proximate to the printhead or not.

Another method of preventing multiple transponder activation is to electro-magnetically isolate transponders from one another. For example, devices or systems may employ an RF-shielded housing or anechoic chamber for shielding the adjacent and non-targeted transponders from the electromagnetic field. In various applications, transponders individually pass though a shielded housing for individualized exposure to an interrogating RF electromagnetic field. Unfortunately, RF-shielded housings add cost and complexity to a system and limit the type (i.e., the size) of transponders they may be processed by the system. Furthermore, many devices are limited with regard to space or weight and, thus, cannot accommodate such shielded housings.

The challenge of avoiding multiple transponder activation may be especially acute in some applications. RFID printer-encoders are one example. RFID printer-encoders are devices capable of encoding and printing on a series or stream of transponders. The close proximity of the transponders to each other, during processing, makes single transponder activation problematic. Moreover, the space, cost, and weight restrictions associated with such devices, among other factors, make collision management techniques or shielding components for alleviating multiple transponder activation less than desirable.

In light of the foregoing it would be desirable to provide a RFID device capable of interrogating individual transponders positioned among multiple adjacent transponders without the need for collision management techniques or shielding components. It also would be desirable if such a device had a relatively compact design to facilitate its use in space-restricted systems, such as mobile or portable RFID printer-encoders.

BRIEF SUMMARY OF THE INVENTION

The present invention may address some of the above needs by providing a near-field coupler for a RFID system configured to selectively communicate with a targeted transponder from among a group of adjacent transponders. The coupler is adapted to have a controlled coupling range that can be limited to minimize the inadvertent activation of transponders outside a transponder encoding region. As such, the coupler operates with little to no collision management techniques or shielding components. The coupler of the present invention is compact, usually one-quarter wavelength or less of a center operating frequency within the UHF band. This compact design minimizes the footprint of the coupler within the space-restricted RFID system. Moreover, the coupler's smaller size relative to the transponder allows for an optimal alignment between the coupler and transponder during the encoding process.

According to one embodiment of the present invention, the RFID system may include a transponder conveyance system, a transceiver, and a near-field coupler. The transponder conveyance system is adapted to transport the targeted transponder through a transponder encoding region. The transceiver is configured to generate one or more communication signals. The near-field coupler is in electrical communication with the transceiver for receiving the communications signals from the transponder and to convert the transceiver's electrical energy to an electro-magnetic field. The near-field coupler includes a terminating load and a conductive strip. The terminating load is set to substantially match an input impedance defined by the coupler and a source impedance defined by the transceiver. The conductive strip is for the transmission of an electromagnetic wave or waves based on the communication signals from the transceiver within an operating frequency range and into the transponder encoding region. The length of the conductive strip is substantially equal to or less than a quarter wavelength of the center frequency of the operating frequency range.

For example, the conductive strip may have a substantially constant width and have a length substantially equal to the quarter wavelength. Or the conductive strip may have a width that varies and have a length equal to or less than the quarter wavelength. The width may vary according to a tapered profile such as a triangular profile, a bow-tie profile, an exponential profile, a Hecken profile, a Klopfenstein profile, or other types.

According to another embodiment, the RFID system is a RFID printer-encoder for printing on and encoding a series of media units where at least one of the media units has a transponder. The printer-encoder includes a printhead, a media conveyance system, a transceiver, and a coupler. The printhead prints indicia onto the media units. The media conveyance system transports the media units and the transponder to the printhead and the transponder encoding region along a feed path. The center of the coupler, according to this embodiment, and the center of the feed path are offset from one another.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 3:
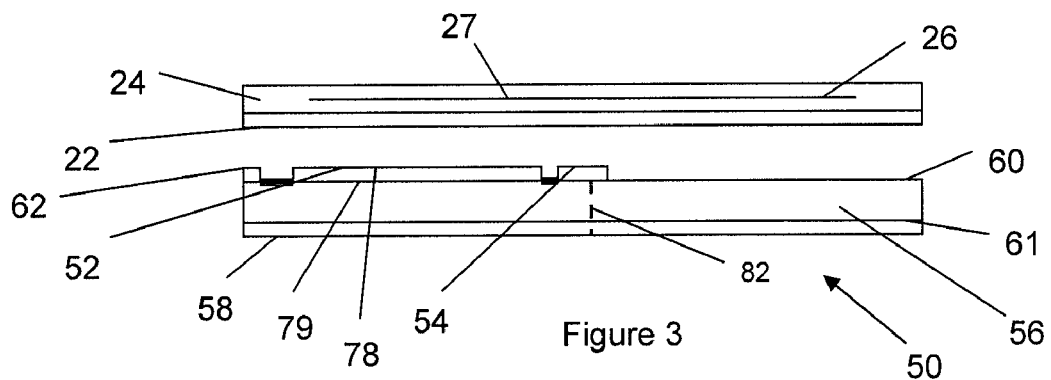
Figure 4:
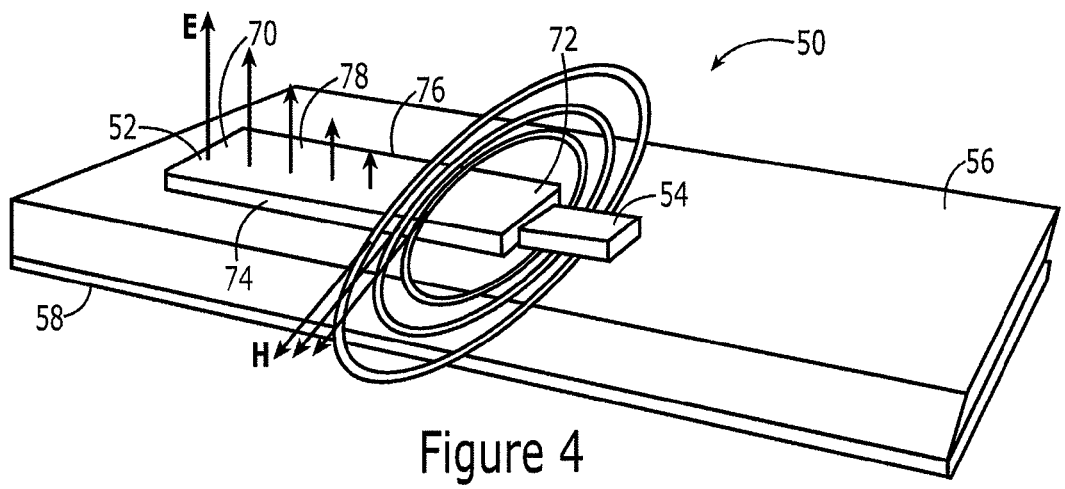
Figure 5:
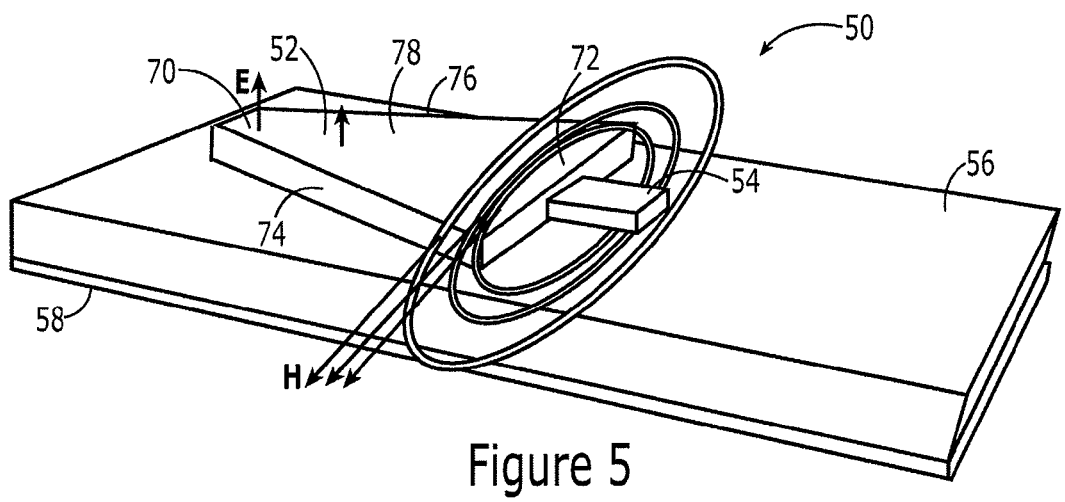

FIG. 3 schematic illustration of a near-field coupler interrogating a transponder disposed on a carrier substrate in accordance with an embodiment of the present invention;

FIG. 4 is a perspective view of an electromagnetic field distribution of a near-field coupler according to an embodiment of the present invention; and FIG. 5 is a perspective view of an electromagnetic filed distribution of a near-field coupler according to another embodiment of the present invention.

DETAILED DESCRIPTION OF THE INVENTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

The present invention concerns an apparatus for enabling an RFID transceiver (sometimes referred to as a "reader") to selectively communicate with a targeted transponder that is commingled among or positioned in proximity to multiple adjacent transponders. As will be apparent to one of ordinary skill in the art, various embodiments of the present invention are described below that selectively communicate with a targeted transponder without requiring physical isolation of the transponder using space-consuming shielded housings, anechoic chambers, or relatively more complex or costly collision management techniques.

Several embodiments of the present invention may be useful for reading, writing, or otherwise encoding transponders located on assembly lines, in inventory management centers where on-demand RFID labeling may be needed, or in other similar circumstances, where the transponders are in close proximity to each other, such as in item-level RFID applications. In various embodiments, one or more transponders are mounted to or embedded within a label, ticket, card, or other media form that may be carried on a liner or carrier. In alternate linerless embodiments, a liner or carrier may not be needed. Such RFID enabled labels, tickets, tags, and other media forms are referred to collectively herein as "media units." As will be apparent to one of ordinary skill in the art, it may be desirable to print indicia such as text, numbers, barcodes, graphics, etc., to such media units before, after, or during communications with their corresponding transponders.

The present invention has been depicted, for illustration purposes, in the context of a specific application, namely, RFID enabled printer systems, also referred to herein as "printer-encoders." Examples of printer-encoders are disclosed in commonly-owned U.S. Pat. Nos. 6,481,907 and 6,848,616, which are hereby incorporated herein by reference. However, the inventive concepts described herein are not limited to printer-encoders and may be applied to other RFID enabled systems that may benefit from the ability to selectively communicate with a targeted transponder disposed among multiple adjacent transponders close to the coupler.

Figure 1:
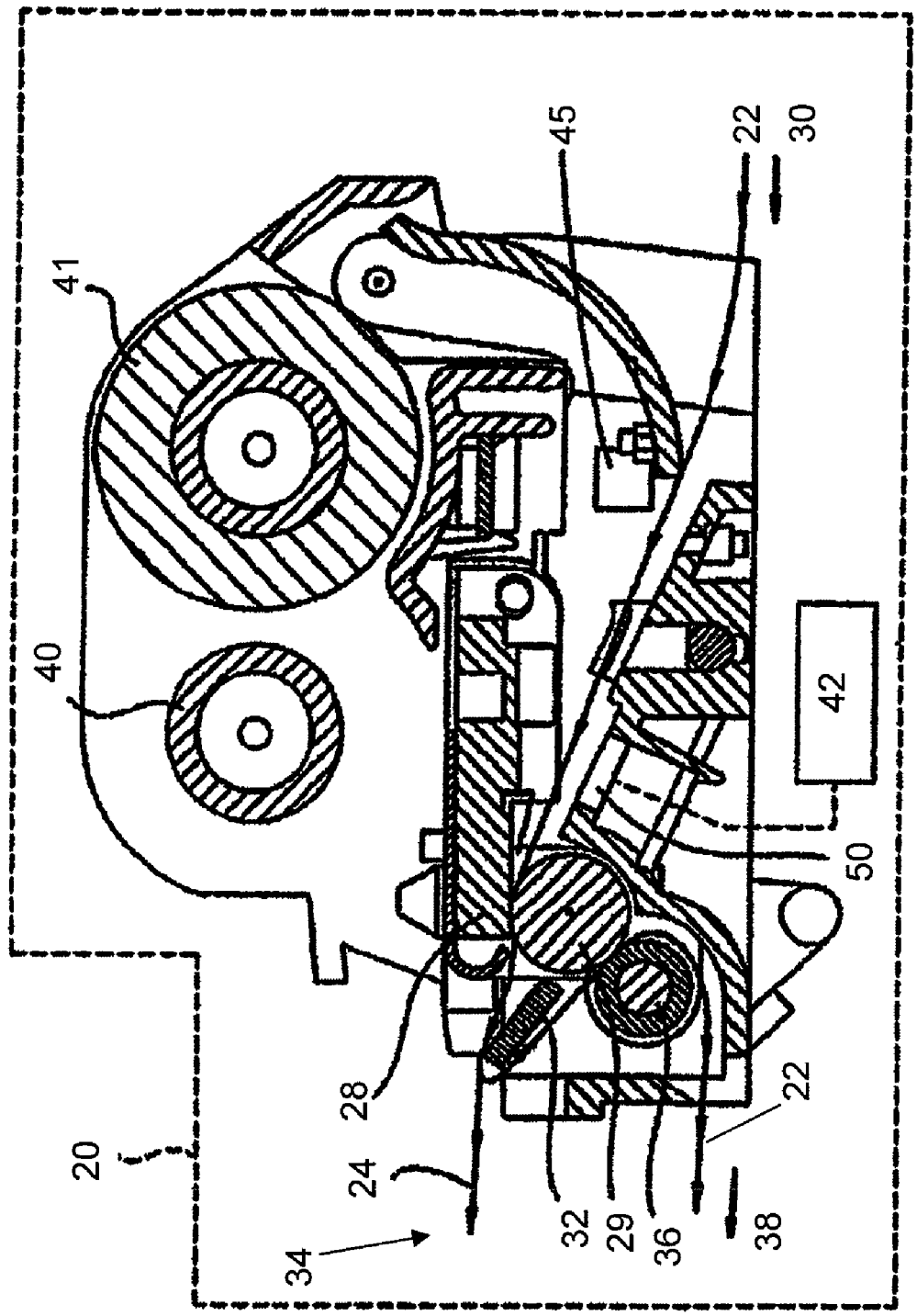
FIG. 1 is a side schematic view of a printer-encoder according to an embodiment of the present invention.
Figure 2:
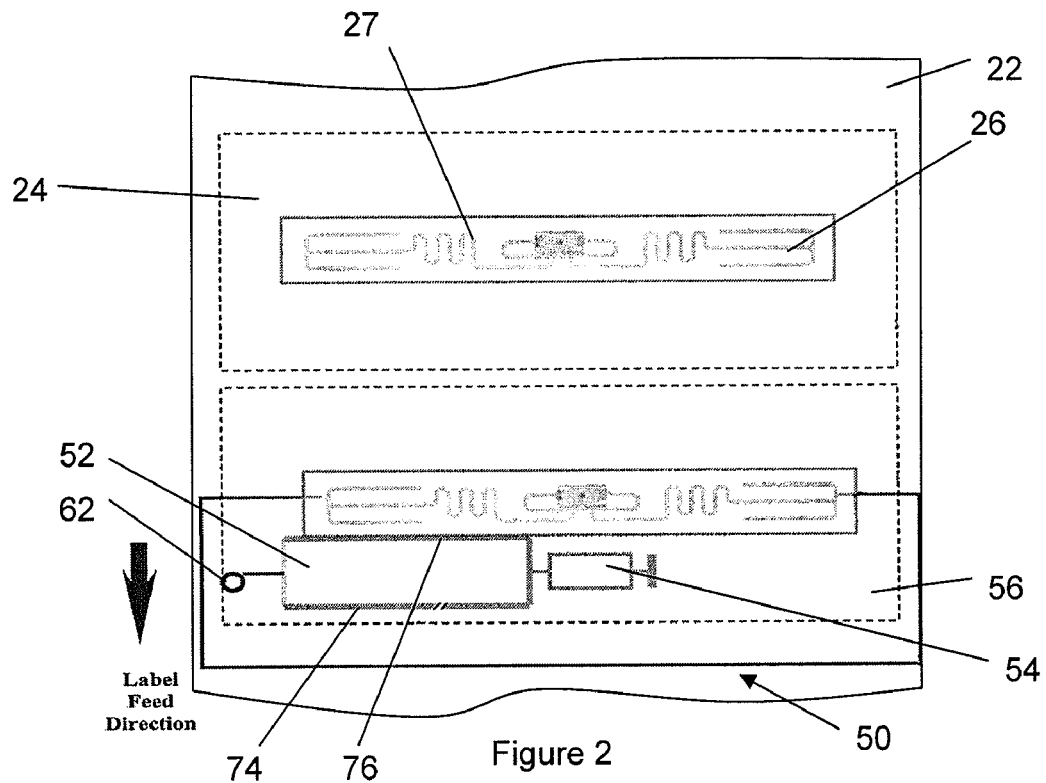
FIG. 2 is a simplified cut-away top view of a web of media units passing over a near-field coupler according to an embodiment of the present invention.

FIG. 1 illustrates an RFID printer-encoder 20 structured for printing and programming a series or stream of media units 24 according to one embodiment of the present invention. In various embodiments, as shown in FIGS. 2 and 3, at least a few of the media units 24 include transponders 26. As noted above, media units may include labels, cards, etc, that are carried by a substrate liner or web 22 as shown.

Referring back to FIG. 1, the printer-encoder 20 includes several components, such as a printhead 28, a platen roller 29, a feed path 30, a peeler bar 32, a media exit path 34, rollers 36, a carrier exit path 38, a take-up spool 40, a ribbon supply roll 41, a transceiver 42, a controller 45, and a near-field coupler 50. The web 22 is directed along the feed path 30 and between the printhead 28 and the platen roller 29 for printing indicia onto the media units 24. The ribbon supply roll 41 provides a thermal ribbon (not shown for clarity) that extends along a path such that a portion of the ribbon is positioned between the printhead 28 and the media units 24. The printhead 28 heats up and presses a portion of the ribbon onto the media units 24 to print indicia. The take-up spool 40 is configured to receive and spool the used ribbon. This printing technique is commonly referred to as a thermal transfer printing. However, several other printing techniques may be used including, but not limited to, direct thermal printing, inkjet printing, dot matrix printing, and electro-photographic printing.

After printing, as shown in FIG. 1, the web 22 proceeds toward the media exit path 34 where the media units 24 are typically individually removed from the web 22. For example, in one embodiment, pre-cut media units 24 may be simply peeled from the web 22 using the peeler bar 32 as shown. In other embodiments, a group of multiple media units may be peeled together and transmitted downstream to an in-line cutter for subsequent separation (not shown). Various other known media unit removal techniques may be used as will be apparent to one of ordinary skill in the art.

In applications, such as the depicted embodiment, in which the media units 24 are supported by a web 22, the web 22 may be guided out of the printer-encoder 20 along the carrier exit path 38 by rollers 36 or other devices. Techniques and structures for conveying or guiding the web of media units along the entire feed path of the printer-encoder are well known in the art and, thus, such techniques and conveyance systems are not described in great detail.

The transceiver 42 is configured for generating and transmitting RF communication signals that are broadcasted by the spatially selective conductive strip near-field coupler 50 located proximate the media feed path 30. For purposes of the present specification and appended claims, the transceiver 42 and the near-field coupler 50 will be referred to collectively as forming at least part of a communication system. As will be explained in more detail below, the communication system transmits an electromagnetic signal or pattern for establishing, at predetermined transceiver power levels, a mutual coupling between the transceiver and a targeted transponder of a media unit that is located in the transponder encoding region, such that data may be read from and written to transponder. The electromagnetic wave has a far field component and a near-field component. In general, the far field component of the electromagnetic wave created by the near-field coupler is too weak to activate or communicate with any of the transponders, while the near-field component is strong mostly in the transponder encoding region such that it only activates or communicates with the transponders in the transponder encoding region.

In general, the transceiver is a device configured to generate, process, and receive electrical communication signals. One in the art would appreciate that similar devices such as transmitters, receivers, or transmitter-receivers may be used within this invention. "Transceiver" as used in the present application and the appended claims refers to the devices noted above and to any device capable of generating, processing, or receiving electrical and/or electromagnetic signals.

FIG. 4 illustrates the near-field coupler 50 in accordance with an embodiment of the present invention. The coupler 50 is structured in electrical communication with the transceiver (not shown in FIG. 4) for receiving and broadcasting the signals originating from the transceiver to the targeted transponder. In the depicted embodiment, the near-field coupler 50 includes a conductive strip 52, a terminating load 54, a dielectric substrate 56, and a ground plane 58. As illustrated the conductive strip 52, dielectric substrate 56, and the ground plane 58 may be generally stacked with the dielectric substrate 56 forming an intermediate layer between the conductive strip 52 and the ground plane 58.

As best seen in FIG. 3, the dielectric substrate 56 may have a first surface, referred to herein for descriptive purposes only as a top surface 60, and an opposite second surface, referred to herein for descriptive purposes only as a bottom surface 61. The distance from the top surface 60 and bottom surface 61 defines a thickness of the substrate 56. The conductive strip 52 is generally adjacent to the top surface 60 of the substrate 56 while the ground plane 58 is generally adjacent to the bottom surface of the substrate 56. Although the dielectric substrate 56 is depicted as being generally rectangular and sized to the conductive strip 52, the general shape of the dielectric substrate and the general size of the dielectric substrate to the conductive strip may vary. For example, the dielectric substrate may be a portion of a relatively larger printed circuit board. The dielectric substrate may be made or constructed from various dielectric materials, including but not limited to, plastics, glasses, ceramics, or combinations such as Rogers material, Isola material, and woven glass reinforced epoxy laminate, commonly referred to as "FR4" or flame resistant 4. One in the art would appreciate that these various materials may be used to utilize a specific dielectric constant.

As explained in more detail below, the conductive strip 52 provides a conductive plane to create an electromagnetic field from the coupler 50 to a targeted transponder. The conductive strip is fabricated from a conductive material. For example purposes only, the conductive material may be copper, gold, silver, aluminum or combination thereof, or doped silicon or germanium. The conductive strip 52 has a length extending from a first end, referred to herein as the input end 70, to a second end, referred to herein as the loaded end 72. The conductive strip also defines a width extending between two opposite side edges 74, 76, and a thickness extending from a first surface, referred to herein only for descriptive purposes as the top surface 78, and an opposite second surface, referred to herein only for descriptive purposes as the bottom surface 79 (visible only in FIG. 3). The top surface 78 of the conductive strip faces away from the top surface 60 of the dielectric substrate while the bottom surface of the conductive strip faces toward and is adjacent to the top surface 60 of the dielectric substrate. The method of fabricating the conductive strip may vary. For example, the conductive strip may be deposited directly onto the dielectric substrate through a printing or etching process.

The input end 70 of the conductive strip is connected to an input port 62. For example purposes only and as shown in FIGS. 2 and 3, the input port 62 may be adjacent to the top surface 60 of the dielectric substrate and may be connected to the input end 70 of the conductive strip by a transmission line or other connection extending between the input port 62 and the input end 70. The loaded end 72 of the conductive strip is connected to the terminating load 54. Again for example purposes only and as shown in FIG. 3, the terminating load 54 may be adjacent the top surface 60 of the dielectric substrate and adjacent and connected to the loaded end 68 of the conductive strip. The terminating load 54 is also connected to the ground plane 58. For example, the terminating load 54 may be connected or grounded by a conductor or other connection 82 extending from the terminating load 54 through the dielectric substrate 56 to the ground plane 58.

The input end 70 of the conductive strip is connected to the transceiver via the input port 62. The input port 62 may be a "RF port" as known in the art. In particular, the transceiver is configured to send an electrical signal to the coupler through the input port. The signal passes through the input port 62, the conductive strip 56, and into the terminating load 54, which is connected to the ground plane 58.

In general as the electrical signal passes through the conductive strip, the conductive strip operates as a transmission line, rather than operating as a standing wave radiating antenna or magnetic field generating coil. The passing signal in the conductive strip 52 generates electromagnetic fields E, H concentrated in the near-field region of the conductive strip 52 as illustrated in FIGS. 4 and 5. The electromagnetic fields may be adapted to couple the coupler to a transponder disposed proximate the conductive strip, referred to herein as the transponder encoding region. A more detailed description of the electromagnetic fields concentrated in the near-field region, also known as "leaky" electromagnetic fields, is provided in "Leaky Fields on Conductive strip" L. O. McMillian et al. Progress in Electromagnetics Research, PIER 17, 323-337, 1997 and in commonly owned U.S. Patent Application Publication Nos. 2005/0045723 and 2005/0045724 to Tsirline et al., which are hereby incorporated by reference. The effective range of couplers relying on such leaky electromagnetic fields is limited because the fields degrade, at an exponential rate, with increasing distance from the coupler. This limited range reduces the likelihood that a given transceiver's signal will activate transponders outside the transponder encoding region.

As discussed in U.S. Pat. No. 7,425,887, filed on Sep. 21, 2005, titled MULTI-LAYERED EFFICIENT RFID COUPLER, assigned to the current assignee of the present application, and hereby incorporated by reference, the coupler defines an input impedance and the transceiver and its related circuitry define a source impedance. Although the source impedance may vary between applications, a common source impedance is 50 ohms. An impedance mismatch between any two components of a circuit, here, the transceiver and the coupler generally creates an undesirable reflection power loss between the two. One of the aspects of the present invention is substantially matching the input impedance of the coupler with the source impedance of the transceiver.

The length of the conductive strip is based on a one-quarter wavelength of a center operating frequency of the coupler. As stated above and seen in FIG. 4, the conductive strip 52 extends from an input end 70 to the loaded end 72 that is connected to the terminating load 54. The conductive strip 52 defines a characteristic impedance ($Z_C$) and the terminating load 54 defines a terminating load resistance ($R_L$). Because of the length of the microstrip, the input impedance ($Z_I$) of the coupler is approximately equal to the square of the characteristic impedance divided by the terminating load resistance, as shown below.

$$Z_I \approx Z_C^2/R_L$$

The characteristic impedance of the conductive strip is defined by its width. A basic principle is that the width and impedance have an inverse relationship. For example, the narrower the conductive strip the higher the characteristic impedance. The width of the conductive strip according to the present invention is appropriately set to achieve the proper coupling level between the conductive strip and the targeted transponder. In general, increasing the width of the conductive strip increases the strength of the electromagnetic fields emanating from the edges of the conductive strip and decreases the operating bandwidth of the coupler.

The terminating load is appropriately set to achieve a substantial impedance match between the source impedance ($Z_S$) defined by the transceiver and the input impedance ($Z_I$) defined by the coupler, such that $Z_S \approx Z_I$. More specifically, the terminating load is set according to the following formula.

$$R_L \approx Z_C^2/Z_S$$

As stated above, the length of the conductive strip is based on a one-quarter wavelength of the center operating frequency within the UHF band of the coupler. For example and as illustrated in FIG. 4, the conductive strip 52 may have a length approximately equal to a quarter-wavelength of the center operating frequency. The length of the conductive strip is generally defined by the distance between the input end 70 and the terminal end 72 of the conductive strip. As stated above, increasing the width of the conductive strip 52 increases the strength of the emanating electromagnetic fields E, H. But by increasing the width of the conductive strip 52 the operating bandwidth decreases, which may be undesirable in some applications. In such applications, the conductive strip 52 may be tapered or non-linear. For example and as illustrated in FIG. 5, the conductive strip 52 may have a width that varies between the input end 70 and the terminal end 72. The varying width defines a tapered profile. More specifically, the width may vary along the conductive strip according to one or more profiles, such as a triangular profile, a bow-tie profile, an exponential profile, a Hecken profile, or a Klopfenstein profile. In general, the tapered profile allows for a length of the conductive strip to be less than one-quarter wavelength while maintaining or increasing the operating bandwidth of the coupler. Moreover, a tapered conductive strip having a length less than one-quarter wavelength has a similar impact on the input impedance as a linear (i.e., having a constant width) conductive strip having a length of a quarter wavelength. Thus the tapered profile allows for a greater operating bandwidth while minimizing the impact on the input impedance.

As shown in FIGS. 2 and 3, the length of the conductive strip 52 according to the present invention provides for novel alignments between the coupler 50 and the targeted transponder 26. The coupler 50 is configured to operate within approximately the same band of frequencies as the transponder's antenna 27. And the length of the transponder's antenna 27 is typically based on one-half wavelength of the center frequency of its band of operating frequencies. Thus the length of the conductive strip 52 may be half or even less than half the size of the transponder's antenna 27. The relative short conductive strip 52 allows for the conductive strip 52 to be offset from the transponder 26 as shown in FIGS. 2 and 3.

Offsetting the conductive strip from the transponder may be beneficial in some applications. If the size of the conductive strip was approximately the size of the transponder then in a space-restricted system, such as a printer-encoder, it is likely that the transponder and the conductive strip would form a centrally stacked alignment, i.e. the transponder and conductive strip would be parallel and co-centric, during coupling. While in the centrally stacked alignment, the transponder would likely cause an impedance mismatch with the source impedance, which in turn, would disrupt the coupling process and cause a power loss. The relatively shortened coupler of the present invention allows for the coupler to be offset from the transponder even in the most space-restricted applications and thus avoid the potential impedance mismatch caused by a centrally stacked alignment. Specifically, as used herein the coupler and transponder are considered offset from each other when the center of the coupler or the conductive strip and the center of the transponder are not aligned with one another during coupling.

As stated above in printer-encoder embodiments, a media conveyance system may be adapted to transport the media units and their transponders along a feed path. Collectively, the center of each of the media units define a center line of the feed path. The relative smaller size of the coupler compared to the transponder allows for the coupler to be placed on an offset from the center line of the feed path. Moreover offsetting the coupler from the transponder may provide an optimal alignment between the coupler and the transponder. Specifically, according to embodiments of the present invention, the coupler has a maximum electric field strength at one end 70 and a maximum magnetic field strength at the other end 72 (as shown in FIGS. 4 and 5). The offset allows the end 72 with the maximum magnetic field strength to be substantially aligned with the center of the transponder or more specifically to the center of the dipole of the transponder, which is the most sensitive area of the dipole to magnetic fields. And the offset further allows the other end 70 with the maximum electric field strength to be substantially aligned with an end (or edge) of the dipole, which is the most sensitive area of the dipole to electric fields. Also as mentioned offsetting the coupler may alleviate the impedance mismatch associated with a centrally stacked alignment.

Although the present invention has been primarily described as a coupler for an RFID enabled system, the present invention may employ more than one coupler and define a coupler array. The individual couplers within the array may be selectively activated in order to follow a targeted transponder as it moves along a predetermined path within the system or accommodate different size or type tags, as further described in U.S. patent publication No. 2007/0099566, filed on Oct. 31, 2005, titled MULTI-ELEMENT RFID COUPLER, assigned to the current assignee of the present application, and hereby incorporated by reference.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An RFID system for selectively communicating with a targeted transponder from among a group of multiple adjacent transponders, the RFID system comprising:
a transponder conveyance system adapted to transport at least one targeted transponder from a group of multiple adjacent transponders through a transponder encoding region;
a transceiver configured to generate a communication signal, wherein the transceiver defines a source impedance; and
a near-field coupler in electrical communication with the transceiver for receiving the communication signal, the near-field coupler defining an input impedance and including,
a grounded terminating load for substantially matching the input impedance to the source impedance, and
a conductive strip for a transmission of an electromagnetic signal within an operating frequency range into the transponder encoding region, the conductive strip defining a length that is less than or substantially equal to a quarter wavelength of a center frequency of the operating frequency range.

2. The RFID system according to claim 1, wherein a center of the near-field coupler is offset from a center of the targeted transponder in the transponder encoding region.

3. The RFID system according to claim 1, wherein the conductive strip defines a width that is substantially constant along the length of the conductive strip and the length is substantially equal to a quarter wavelength of the center frequency.

4. The RFID system according to claim 1, wherein the conductive strip defines a width that varies along the length and defines a tapered profile and the length is less than a quarter wavelength of the center frequency.

5. The RFID system according to claim 4, wherein the tapered profile is selected from the group consisting of a triangular profile, a bow-tie profile, an exponential profile, a Hecken profile, and a Klopfenstein profile.

6. An RFID printer-encoder for printing and programming a series of media units wherein at least one of the media units includes at least one transponder, the RFID printer-encoder comprising:
a printhead for printing indicia onto the series of the media units;
a media conveyance system for transporting the series of media units including the transponder along a feed path and to the printhead and a transponder encoding region;
a transceiver for generating a communication signal; and
a coupler for receiving the communication signal and creating an electromagnetic field into the transponder encoding region, wherein a center of the coupler is offset from a center line of the feed path.

7. The RFID printer-encoder according to claim 6, wherein the coupler includes a conductive strip configured to create the electromagnetic field substantially concentrated in the near-field region of the conductive strip.

8. The RFID printer-encoder according to claim 7, wherein the transceiver defines a source impedance and the coupler defines an input impedance and further includes a terminating load for substantially matching the input impedance and the source impedance.

9. The RFID printer-encoder according to claim 8, wherein the conductive strip is configured to create the electromagnetic field within a range of frequencies and the conductive strip defines a width and a length, wherein the length is substantially equal to a quarter wavelength of a center frequency of the range of frequencies and the width is substantially constant along the length.

10. The RFID printer-encoder according to claim 8, wherein the conductive strip is configured to create the electromagnetic field within a range of frequencies and the conductive strip defines a width and a length, wherein the length is less than a quarter wavelength of a center frequency of the range of frequencies and the width varies along the length and defines a tapered profile.

11. The RFID printer-encoder according to claim 10, wherein the tapered profile is selected from a group consisting of a triangular profile, a bow-tie profile, an exponential profile, a Hecken profile, and a Klopfenstein profile.

12. A RFID system adapted to provide selective communication between a transceiver and a targeted transponder disposed among multiple adjacent transponders and in a transponder encoding region, wherein the targeted transponder includes an antenna that defines a first length, the RFID system comprising:
a near-field coupler structured to receive at least one communication signal from the transceiver and further configured to create an electromagnetic field substantially concentrated in a near-field region of the coupler and into the transponder encoding region, wherein the near-field coupler defines a second length that is substantially equal to or less than one half the first length defined by the antenna of the targeted transponder.

13. The RFID system according to claim 12, wherein a center of the near-field coupler is offset from a center of the targeted transponder during the selective communication.

14. The RFID system according to claim 12, wherein the near-field coupler includes a conductive strip adapted to create the electromagnetic field.

15. The RFID system according to claim 14, wherein the transceiver defines a source impedance and the near-field coupler defines an input impedance and further includes a terminating load for substantially matching the source impedance and the input impedance.

16. The RFID system according to claim 14, wherein the conductive strip is configured to create the electromagnetic field within a range of frequencies and the conductive strip defines a width and a length, wherein the length is substantially equal to a quarter wavelength of a center frequency of the range of frequencies and the width is substantially constant along the length.

17. The RFID system according to claim 14, wherein the conductive strip is adapted to create the electromagnetic field within a range of frequencies and the conductive strip defines a width and a length, wherein the length is less than a quarter wavelength of a center frequency of the range of frequencies and the width varies along the length and defines a tapered profile.

18. The RFID system according to claim 17, wherein the tapered profile is selected from a group consisting of a triangular profile, a bow-tie profile, an exponential profile, a Hecken profile, and a Klopfenstein profile.

* * * * *